United States Patent [19]

Franceschini

[11] Patent Number: 5,172,507
[45] Date of Patent: Dec. 22, 1992

[54] COLLAPSIBLE WATERFOWL DECOY

[75] Inventor: Augusto Franceschini, Rero, Italy

[73] Assignee: Carry-Lite, Inc., Milwaukee, Wis.

[21] Appl. No.: 815,342

[22] Filed: Dec. 27, 1991

[51] Int. Cl.⁵ .............................................. A01M 31/06
[52] U.S. Cl. ........................................................... 43/3
[58] Field of Search ................................. 43/2, 3, 26.1

[56] References Cited

U.S. PATENT DOCUMENTS

| | | |
|---|---|---|
| 1,469,188 | 9/1923 | Moore . |
| 2,339,983 | 1/1944 | Day ............................................. 43/3 |
| 2,391,475 | 12/1945 | Newhardt . |
| 2,483,680 | 10/1949 | Timm et al. . |
| 2,495,721 | 1/1950 | Heymann . |
| 2,546,189 | 3/1951 | Keep et al. . |
| 2,564,890 | 8/1951 | Fox . |
| 2,736,120 | 2/1956 | Lestin ............................................ 43/3 |
| 2,817,918 | 12/1957 | Phillips . |
| 2,893,154 | 7/1959 | McKee ............................................ 43/3 |
| 3,047,972 | 8/1962 | Taylor ............................................ 43/3 |
| 3,254,439 | 6/1966 | Hansen . |
| 3,460,283 | 8/1969 | Stephens . |
| 3,704,538 | 12/1972 | Gagnon ........................................ 43/3 |
| 3,896,578 | 4/1974 | Franceschini . |
| 4,539,772 | 9/1985 | Forbes et al. .............................. 43/3 |
| 4,651,458 | 3/1987 | Lanius . |

Primary Examiner—Richard K. Seidel
Assistant Examiner—Chuck Y. Mah
Attorney, Agent, or Firm—Nilles & Nilles

[57] ABSTRACT

A light weight, inflatable waterfowl decoy is comprised of essentially two isolated chambers, the first being a soft shell main body in the shape of a waterfowl, and the second being an elongated tube-like keel attached to the underside of the decoy. The main body has a resealable air orifice for selectively inflating and collapsing the decoy. The keel has a resealable orifice for selectively inserting or removing a ballast material.

1 Claim, 1 Drawing Sheet

COLLAPSIBLE WATERFOWL DECOY

BACKGROUND OF THE INVENTION

This invention relates to a lightweight, collapsible waterfowl decoy which includes a selectively weightable keel.

A hunter will often set out a collection of decoys on a pond, lake, or river for the purpose of attracting live birds to the hunting area. Each decoy is shaped and colored to represent a real duck, goose or other waterfowl. If the decoy is properly made and if a number of them are properly arranged, live birds flying overhead may be attracted to the hunting area.

Decoys floating on water have a tendency to tip over due to waves or strong currents, so decoys are often provided with a weighted keel to maintain stability of the decoy on the water. The keel typically consists of a heavy ballast material, usually metal, encased in plastic or other waterproof material and attached to the underside of the decoy.

The combined weight of a large number of weighted keel type decoys can be quite difficult for the hunter to carry to and from the hunting area. If the decoy has a rigid body (i.e. non-collapsible), the bulk of a large number of decoys adds to the difficultly of transporting them to and from the hunting area. The weighted keel type decoy has the further drawback of requiring the additional manufacturing steps of providing the metal ballast material, encasing it, and attaching it to the underside of the decoy, thus increasing manufacturing costs. The weight of such decoys, and the large space requirements of the rigid body type decoys, requires the manufacturer to incur relatively large transportation costs in shipping the product to retailers.

Others have attempted to provide an inflatable decoy, but such efforts have not met with much success in that such decoys are usually unweighted and therefore have a tendency to tip over in the water, or the final, inflated product does not look realistic enough to effectively attract live waterfowl. The applicant is aware of no prior art decoys which have a keel selectively weightable by the hunter.

SUMMARY OF THE INVENTION

A novel hunting decoy, which is collapsible and which has a selectively weightable keel is disclosed. The invention includes two hollow, isolated compartments—a relatively large main body which is inflatable/collapsible, and a relatively small, selectively weightable keel. The invention is lightweight and collapsible for easy transport to and from the hunting area.

The invention may be inflated and deflated many times over for multiple uses by the hunter. The invention has a keel which may, at the option of the hunter, be weighted to any degree that he prefers. The hunter at the hunting area can easily insert or remove ballast material such as sand, gravel or water. The invention thus provides for a compact, lightweight decoy which the hunter can easily carry to and from the hunting area, yet also provides for a decoy which will not tip over in rough water.

The hunter may further adjust the amount of ballast inserted into the keel, or alternatively adjust the amount of air injected into the main body of the decoy, to have the decoy ride relatively higher or lower in the water as the hunter desires. The head and neck position of the decoy can also be varied, depending on the amount of air injected into the main body of the decoy. By setting out a number of decoys which ride in the water differently and have varying head positions, the hunter creates a more realistic looking flock of decoys which are more attractive to live birds than can be done with prior known decoys.

The invention is also very easy to manufacture—no extra step in adding and encasing a ballast material in the keel. The lightweight, collapsible nature of the decoy further provides a significant advantage in freight cost, regardless of whether a shipper charges by volume or weight. The retailer also saves costs by using less shelf space to display and store the decoys.

Other objects and advantages of this invention will become apparent from the following description taken in connection with the accompanying drawings which set forth, by way of illustration and example, certain embodiments of this invention.

BRIEF DESCRIPTION OF THE DRAWINGS

The drawings, which constitute part of this specification and include exemplary embodiments of the present invention, include the following.

DETAILED DESCRIPTION

Figure 1:
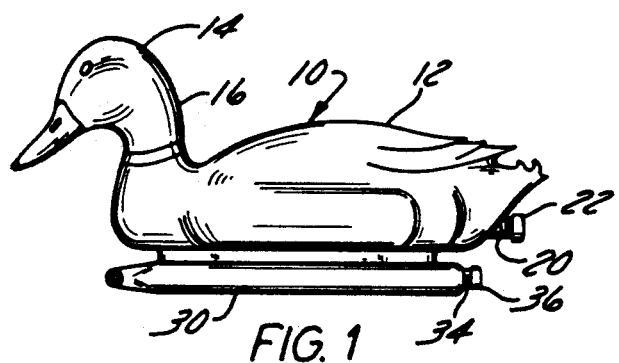
FIG. 1 is a side view of the decoy of the invention in the inflated state.
Figure 2:
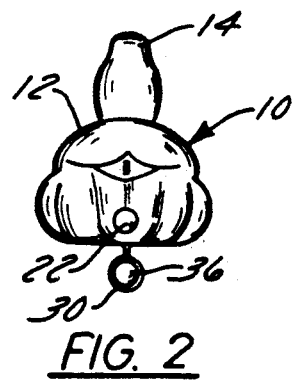
FIG. 2 is a rear view of the decoy shown in FIG. 1.
Figure 3:
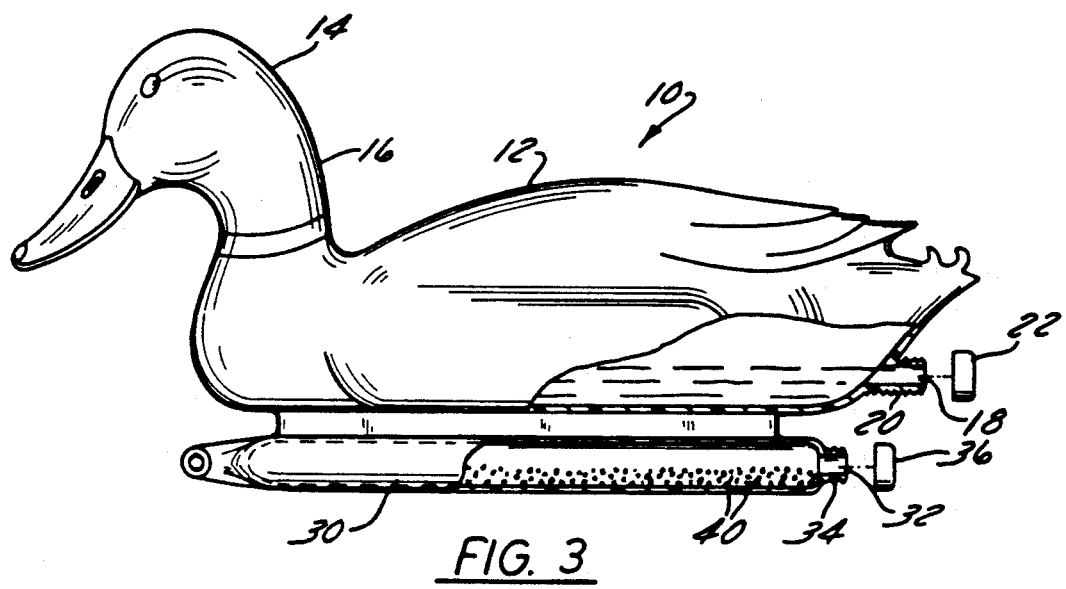
FIG. 3 is a partial sectional view showing the isolated compartments in the main body and the keel.
Figure 4:
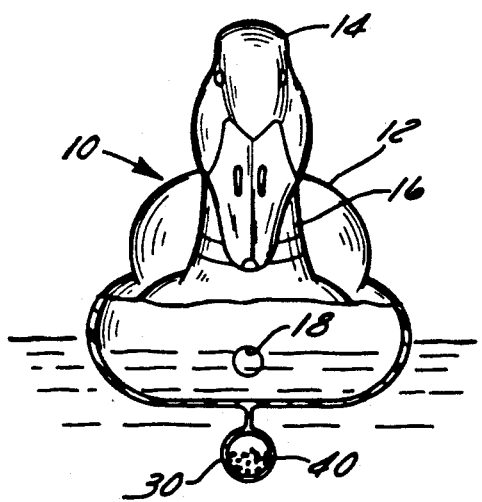
FIG. 4 is a front partial sectional view of the decoy shown deployed on a water surface, and showing the two isolated compartments.
Figure 5:
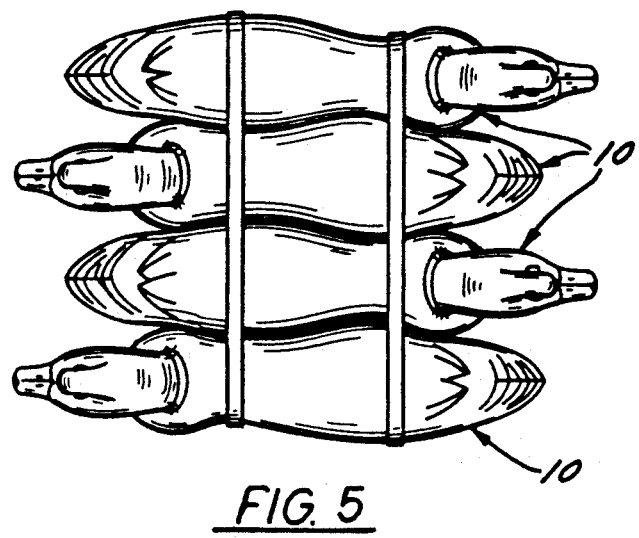
FIG. 5 shows a set of four decoys collapsed and bound together.

The invention has essentially two hollow compartments, the first being the main body 10 of the decoy and the second being the keel 30.

The main body 10 is a large hollow, soft plastic shell in the shape of a waterfowl, including the body 12, head 14 and neck 16. An air orifice 18, preferably on the backside of the decoy, is used for injecting air into the interior of the main body 10 to inflate it into a bird-like shape, and for ejecting air to collapse it. Means for sealing the air orifice 18 permits repeated opening and resealing of the air orifice 18. Such means for sealing the air orifice 18 preferably comprises an externally threaded pipe section 20 and a matching threaded cap 22. A hunter can inflate the decoy by simply blowing air into the air orifice 18 of the main body 10. The cap 22 seals the air orifice 18 to keep air in the main body 10 and water out. The hunter can easily collapse the decoy by removing the cap 22 and squeezing the main body 10 by hand, thus ejecting air out from the main body 10 to flatten it.

The keel 30 is an elongated, tube-like section on the underside of the main body 10. The keel 30 also has a hollow compartment, much smaller than the compartment of the main body 10, which is used for holding a ballasting material if the hunter desires to have it. The compartment of the keel 30 is isolated from the compartment of the main body 10. The keel 30 has an orifice or opening 32, also located on the backside of the decoy, and a means for sealing the orifice 32, again preferably an externally threaded pipe section 34 and a matching threaded cap 36. The orifices 18, 32 in the main body 10 on the keel 30 are preferably the same size so that the caps 22, 36 are interchangeable. When the hunter arrives at the hunting area he may, at his option, fill the keel 30 with a ballasting material 40, such as metal shot, sand, gravel, water, and so forth. The ballast material is easily removable at the end of the hunt. Water is the most convenient ballast material since it is usually in plentiful supply at the hunting site and it is easy to pour into and out of the keel 30.

Even though the decoy has essentially two compartments—the main body 10 and the keel 30—the decoy as a whole is manufactured through the blow-molding process as a single unit. This invention is therefore easier and cheaper to manufacture than the typical weighted keel type decoy. The decoy is made from a molded plastic, such as low density polyethylene, which provides for a relatively soft shell, such that the main body 10 is easily collapsible, but when inflated it readily pops up into a realistic bird-like shape. This material also holds paint extraordinarily well so the decoy can be expertly painted to appear like a real bird and the paint won't flake or peel off in spite of repeated inflating and collapsing of the decoy.

This novel design of a hunting decoy has several advantages over the prior art. The hunter may set out several decoys, some riding relatively high in the water and others riding relatively low. This effect may be achieved by placing more or less ballast material in the keel 30, as desired by the hunter. It may also be achieved by injecting more or less air into the main body 10 as the case may be. A decoy riding high in the water (by being fully inflated and having little or no ballast in the keel will rock in the water due to wave action more vibrantly than a decoy riding low in the water (which has relatively heavy ballast and little air to maintain the buoyancy).

Varying the amount of air in the main body 10 provides the further advantage of varying the angular position of the head 14 and neck 16 of the decoy. For example, as compared to the fully inflated state as shown in FIG. 1, the hunter may partially collapse the main body 10 by tilting the head 14 and neck 16 backwards. When the hunter seals the air orifice 18 he essentially locks in a specific amount of air in the main body 10 which in effect holds the head 14 and neck 16 in that tilted position. The hunter may have some decoys with the head 14 pointed relatively down (fully inflated), and others with the head 14 cocked relatively upward (partially collapsed).

These variances in water height and head positions among an array of decoys provide for a very realistic looking flock, and which is therefore quite attractive to real birds. This invention when collapsed takes up about one-half of the space of a rigid body type decoy, and weighs about one-half as much as a permanently weighted keel type decoy. This invention therefore provides significant savings on shipping costs by the manufacturer, saves on storage and shelf space for the dealer, and allows the hunter to easily carry it (or several of them) to and from the hunting area.

It is understood that the embodiment disclosed above is merely exemplary of the invention, which may be embodied in various forms. Therefore, specific structural details disclosed above are not to be interpreted as limiting, but merely as a basis for the claims and as a representative basis for teaching one skilled in the art to employ the present invention in any appropriately detailed structure. Changes may be made in the details of construction and arrangement of the invention without departing from the spirit of the invention, especially as defined in the following claims.

I claim:

1. A lightweight, collapsible waterfowl decoy, comprising:

a main body comprising a hollow soft plastic shell in the shape of the body, head and neck of a waterfowl;

an orifice in the form of an externally threaded pipe section on the backside of the main body for optionally injecting and ejecting air therefrom;

the main body being in a collapsed condition when air has been ejected therefrom, or in an inflated position when air has been injected therein, or in a partially inflated position therebetween; and an elongated tubular keel integrally molded to, yet isolated from, the underside of the main body, the keel having an elongated, tubular hollow compartment for containing a ballast material;

an orifice in the form of a second externally threaded pipe section on the backside of the keel for inserting and removing the ballast; and interchangeable first and second internally threaded caps for sealing and unsealing the orifices of the first and second externally threaded pipe section;

whereby the position of the head and neck of the main body and the riding height of the decoy in the water may be optionally varied by varying the amount of air injected into the main body and by varying the amount of ballast material inserted into the keel.

* * * * *